United States Patent
Li

(10) Patent No.: US 12,474,735 B2
(45) Date of Patent: Nov. 18, 2025

(54) COMMUNICATION METHOD AND COMMUNICATION APPARATUS, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 595 days.

(21) Appl. No.: 17/907,384

(22) PCT Filed: Mar. 26, 2020

(86) PCT No.: PCT/CN2020/081505
§ 371 (c)(1),
(2) Date: Sep. 26, 2022

(87) PCT Pub. No.: WO2021/189384
PCT Pub. Date: Sep. 30, 2021

(65) Prior Publication Data
US 2023/0117170 A1     Apr. 20, 2023

(51) Int. Cl.
H04W 76/28 (2018.01)
G06F 1/16 (2006.01)
H04W 88/04 (2009.01)

(52) U.S. Cl.
CPC ............ *G06F 1/163* (2013.01); *H04W 76/28* (2018.02); *H04W 88/04* (2013.01)

(58) Field of Classification Search
CPC ....... G06F 1/163; H04W 76/28; H04W 88/04; H04W 8/24; Y02D 30/70; H04L 5/0053
See application file for complete search history.

(56) References Cited

U.S. PATENT DOCUMENTS

| | | |
|---|---|---|
| 2011/0171990 A1 | 7/2011 | Jin et al. |
| 2014/0044029 A1* | 2/2014 | Chou ............... H04W 52/0216 370/331 |
| 2016/0105759 A1 | 4/2016 | Wang et al. |
| 2016/0112498 A1 | 4/2016 | Zhang et al. |
| 2017/0078837 A1 | 3/2017 | Liang et al. |
| 2018/0091303 A1 | 3/2018 | Brook et al. |
| 2021/0298034 A1* | 9/2021 | He ........................ H04W 72/12 |

FOREIGN PATENT DOCUMENTS

| | | | | |
|---|---|---|---|---|
| CN | 105794181 A | | 7/2016 | |
| CN | 108566686 A | * | 9/2018 | ............. H04W 4/70 |
| CN | 108777859 A | | 11/2018 | |
| CN | 109417793 A | | 3/2019 | |
| CN | 110290261 A | | 9/2019 | |
| CN | 110786030 A | | 2/2020 | |

OTHER PUBLICATIONS

"Report on [105bis#28][NR/Power Savings] UE assistance," Proceedings of the 3GPP TSG RAN WG2 Meeting #106, Intel Corporation, R2-1906426, May 6, 2019, Reno, Nevada, 24 pages.

* cited by examiner

Primary Examiner — Michael A Keller
(74) Attorney, Agent, or Firm — McCoy Russell LLP

(57) ABSTRACT

A method for communication, an apparatus for communication and a storage medium. The method for communication performed by a terminal and includes: determining a wearable device having a bonding relation with the terminal, and wearable device auxiliary information for the wearable device; and reporting the wearable device auxiliary information to a network device.

18 Claims, 6 Drawing Sheets

COMMUNICATION METHOD AND COMMUNICATION APPARATUS, AND STORAGE MEDIUM

CROSS REFERENCE TO RELATED APPLICATION

The present application is a U.S. National Phase of International Application No. PCT/CN2020/081505 entitled "COMMUNICATION METHOD AND COMMUNICATION APPARATUS, AND STORAGE MEDIUM," and filed on Mar. 26, 2020. The entire contents of the above-listed application are hereby incorporated by reference for all purposes.

BACKGROUND

Various types of communication devices have been introduced as communication technology develops. For example, wearable devices such as smart bracelets, smart watches, etc. were introduced in the deployment of NR-lite in R17.

Generally, wearable devices can be in direct communication with network devices such as base stations on the basis of wide area network (WAN) communication links. Further, wearable devices and terminals such as mobile phones can be connected with each other on the basis of personal area network (PAN) communication links, and can be in communication with each other through near-field communication. For example, wearable devices and terminals can be connected with each other by means of Bluetooth, WIFI, etc.

SUMMARY

The disclosure provides a method for communication, an apparatus for communication and a storage medium.

A first aspect of examples of the disclosure provides a method for communication. The method for communication is performed by a terminal and includes:
  determining a wearable device having a bonding relation with the terminal, and wearable device auxiliary information for the wearable device; and reporting the wearable device auxiliary information to a network device.

A second aspect of an example of the disclosure provides a method for communication. The method for communication is applied to a network device and includes:
  obtaining wearable device auxiliary information reported by a terminal, the wearable device auxiliary information being auxiliary information of a wearable device having a bonding relation with the terminal; and configuring communication parameters for the wearable device on the basis of the wearable device auxiliary information.

A third aspect of examples of the disclosure provides an apparatus for communication. The apparatus for communication includes:
  a processor; and a memory for storing instructions that may be executed by the processor,
  the processor being configured to execute the method for communication in the first aspect or any implementation in the first aspect.

A fourth aspect of examples of the disclosure provides an apparatus for communication. The apparatus for communication includes:
  a processor; and a memory for storing instructions that may be executed by the processor,
  the processor being configured to execute the method for communication in the second aspect or any implementation in the second aspect.

A fifth aspect of examples of the disclosure provides a non-transitory computer-readable storage medium. When executed by a processor of a mobile terminal, instructions in the storage medium enable the mobile terminal to execute the method for communication in the first aspect or any implementation in the first aspect.

A sixth aspect of examples of the disclosure provides a non-transitory computer-readable storage medium. Instructions in the storage medium, when executed by a processor of a network device, enable the network device to execute the method for communication in the second aspect or any implementation in the second aspect.

It should be understood that the above general description and the following detailed description are only illustrative and explanatory, and may not limit the disclosure.

BRIEF DESCRIPTION OF THE DRAWINGS

The accompanying drawings herein, which are incorporated in the description as a constituent part of the description, illustrate the examples conforming to the disclosure and are used to explain the principles of the disclosure together with the description.

DETAILED DESCRIPTION

The examples will be described in detail herein and shown in the accompanying drawings exemplarily. When the following descriptions relate to the accompanying drawings, unless otherwise specified, the same numeral in different accompanying drawings denotes the same or similar element. The implementations described in the following examples do not denote all implementations consistent with the disclosure. On the contrary, the implementations are merely examples of apparatuses and methods consistent with some aspects of the disclosure as detailed in the appended claims.

The disclosure relates to the technical field of communication, and particularly relates to a method for communication, an apparatus for communication, and a storage medium.

Various types of communication devices have been introduced as communication technology develops. For example, wearable devices such as smart bracelets, smart watches, etc. were introduced in the deployment of NR-lite in R17.

Generally, wearable devices can be in direct communication with network devices such as base stations on the basis of wide area network (WAN) communication links. Further, wearable devices and terminals such as mobile phones can be connected with each other on the basis of personal area network (PAN) communication links, and can be in communication with each other through near-field communication. For example, wearable devices and terminals can be connected with each other by means of Bluetooth, WIFI, etc.

In the related art, applications (APPs) run on wearable devices. In addition, auxiliary information on communication between wearable devices and network devices such as base stations can be determined by counting behaviors of users of the wearable devices, and parameters for communication of the wearable devices are set according to the auxiliary information, which facilitates running of APPs installed on the wearable devices. Thus, how to obtain auxiliary information of wearable devices by network devices is an urgent problem to be solved.

Figure 1:
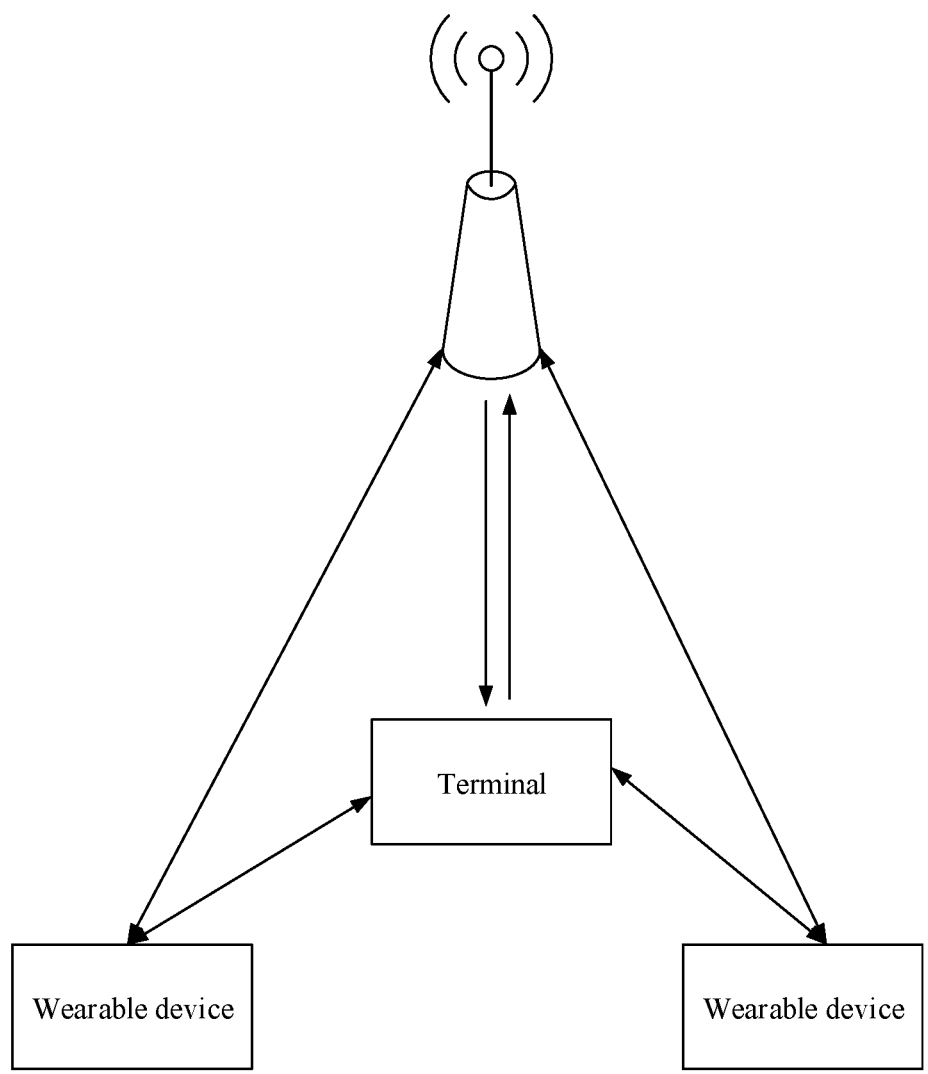
FIG. 1 is an architecture diagram of a communication system shown according to an example.

A method for communication provided in an example of the disclosure may be performed by a communication system shown in FIG. 1. In FIG. 1, a wearable device is in direct communication with a network device, is in communication with a terminal, or is in communication with a network device by means of a terminal.

Generally, a wearable device is in communication with a network device on the basis of a wide area network (WAN) communication link, and a wearable device is in communication with a terminal on the basis of a personal area network (PAN) communication link.

The network device involved in the disclosure may also be referred to as radio access network device. The radio access network device may be a base station, an evolved node B (base station), a home base station, an access point (AP) in a wireless fidelity (WIFI) system, a wireless relay node, a wireless backhaul node, a transmission point (TP) or a transmission and reception point (TRP), etc., may also be a generation node B (gNB) in a new radio (NR) system, or may also be an assembly or part of devices, etc. that constitute a base station. It should be understood that in an example of the disclosure, specific technology and specific device forms used for a network device are not limited. In the disclosure, a network device may provide communication coverage for a particular geographic area, and may be in communication with a terminal located within this coverage area (cell). In addition, in the case that a communication system is a vehicle to everything (V2X) communication system, a network device may also be a vehicle-mounted device.

Further, a terminal involved in the disclosure may also be referred to as a terminal device, a user equipment (UE), a mobile station (MS), a mobile terminal (MT), etc., which is a device that provides voice and/or data connectivity for a user. For example, a terminal may be a handheld device, a vehicle-mounted device, etc. having a wireless connection function. At present, some examples of terminals are a mobile phone, a pocket personal computer (PPC), a palm computer, a personal digital assistant (PDA), a laptop computer, a tablet computer, a wearable device, or a vehicle-mounted device. In addition, in the case that a communication system is a vehicle to everything (V2X) communication system, a terminal device may also be a vehicle-mounted device. It should be understood that an example of the disclosure does not limit specific technology and specific device form used for a terminal.

Further, a wearable device involved in the disclosure may also be referred to as a portable device, generally exists in the form of a portable accessory that has a partial computing function and may be connected with various terminals such as a mobile phone. For example, wearable devices may be wrist-supported wearable products (including smart watches, smart bracelets or wristbands), foot-supported wearable products (including shoes, socks or other leg-worn products in the future), head-supported wearable products (including glasses, helmets, headbands, etc.), and smart clothing, schoolbags, crutches, accessories and other wearable products.

In the related art, the following auxiliary information is introduced for a terminal, which may be referred to as terminal auxiliary information hereinafter. Terminal auxiliary information may be roughly divided into the following types:

1) Discontinuous reception (DRX) parameter type auxiliary information. DRX parameter type auxiliary information includes parameters such as an expected inactive timer duration, an expected long period, an expected short period reported by a terminal.

2) Bandwidth type auxiliary information parameter. A bandwidth type auxiliary information parameter includes the number of secondary cells (scells) or a bandwidth, etc expected by a terminal.

3) Multiple input multiple output (MIMO) type auxiliary information. Multiple input multiple output (MIMO) type auxiliary information includes the expected number of layers of antennas.

4) Release type information. The release type information includes whether a terminal expects that an entire radio resource control (RRC) connection is released or only a secondary cell group (SCG) is released.

By introducing auxiliary information, a terminal may be clearer about characteristics of traffic. For example, applications (APPs) frequently used by a user and types of the APPs may be obtained by counting behaviors of a user, so as to obtain certain detailed characteristics of traffic, such as periodicity of service, burstiness of service and packet sizes. These information is conducive to improvement in configuration of certain parameters of a network on a terminal.

In the deployment of NR-lite in R17, a wearable device is introduced, such that in order to optimize communication parameters of the wearable device, load information of the wearable device, hereinafter referred to as wearable device auxiliary information, may be further introduced. Wearable device auxiliary information includes, but is not limited to, the following types:

service characteristic type auxiliary information, discontinuous reception (DRX) parameter configuration type auxiliary information, bandwidth type auxiliary information, release type auxiliary information, mobility type auxiliary information and distance type auxiliary information.

a) Service characteristic type auxiliary information, such as traffic pattern.

b) Discontinuous reception (DRX) parameter configuration type auxiliary information c) Bandwidth type auxiliary information. Bandwidth type auxiliary information may be, for example, a bandwidth required by service.

d) Release type auxiliary information. Release type auxiliary information may represent, for example, that a wearable device is released, specifically, the wearable device is released into an idle or inactive state.

e) Mobility type auxiliary information. Mobility type auxiliary information may represent, for example, that a wearable device is in a high, medium, or low mobility state.

f) Distance type auxiliary information. Distance type auxiliary information may represent, for example, whether a wearable device and a terminal are connected with each other by means of a personal area network (PAN).

Further, in the related art, a wearable device and a terminal are in communication with each other on the basis of a near-field method for communication, and the terminal may obtain usage data of the wearable device. Computing and processing capabilities of the terminal are superior to a processing capability of the wearable device, such that the terminal may obtain usage data of the wearable device more accurately and comprehensively. For example, a terminal may carry out counting and evaluation simultaneously according to a user behavior that a wearable device user uses a mobile phone, and a user behavior that the wearable device user connects the mobile phone by means of a personal area network (PAN). Thus, terminals such as mobile phones may provide certain auxiliary information for wearable devices, and report the auxiliary information to network devices such as base stations such that the network devices may better configure communication parameters for the wearable devices.

Figure 2:
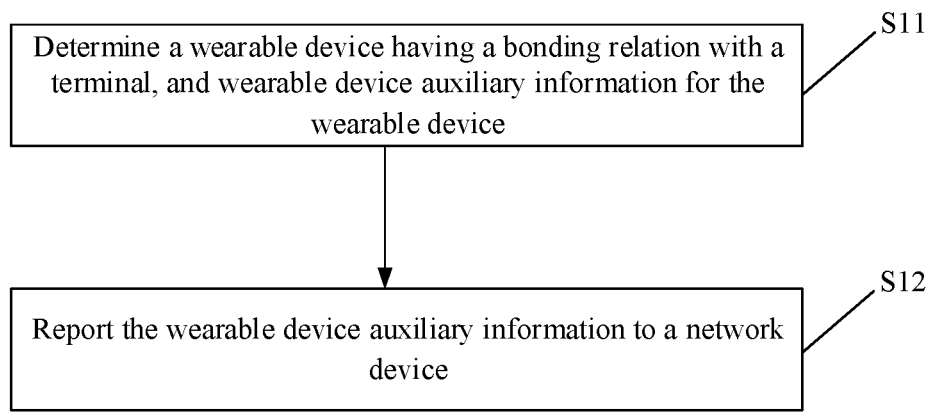
FIG. 2 is flow diagram of a method for communication shown according to an example.

FIG. 2 is flow diagram of a method for communication shown according to an example. As shown in FIG. 2, the method for communication is used for a terminal and includes the following steps S11 and S12.

Step S11: determine a wearable device having a bonding relation with the terminal, and wearable device auxiliary information for the wearable device.

In an example of the disclosure, a wearable device and a terminal are usually connected with each other on the basis of a personal area network (PAN), and then are in communication with each other after being paired and bonded, such that a terminal may determine a wearable device having a bonding relation with the terminal.

It can be understood that a terminal may determine a wearable device currently connected with the terminal as a wearable device having a bonding relation with the terminal. A terminal may also determine a wearable device that was connected but is not currently connected with the terminal as a wearable device having a bonding relation with the terminal.

After determining the wearable device having a bonding relation with the terminal, the terminal may determine the wearable device auxiliary information for the wearable device having a bonding relation with the terminal.

In an example of the disclosure, the wearable device auxiliary information includes but is not limited to service characteristic type auxiliary information, discontinuous reception (DRX) parameter configuration type auxiliary information, bandwidth type auxiliary information, release type auxiliary information, mobility type auxiliary information and distance type auxiliary information.

It can be understood that types of wearable device auxiliary information involved in an example of the disclosure are illustrated by examples, and with subsequent evolution and development of communication technology, the types of the wearable device auxiliary information may also be updated and not limited to the above involved types of the wearable device auxiliary information.

It can be understood that there may be one or more wearable devices having a bonding relation with a terminal determined by the terminal.

Step S12: report the wearable device auxiliary information to a network device.

In an example of the disclosure, the wearable device auxiliary information is determined and reported by means of the terminal such that the network device may better configure communication parameters for a bonded device after receiving the wearable device auxiliary information.

Figure 3:
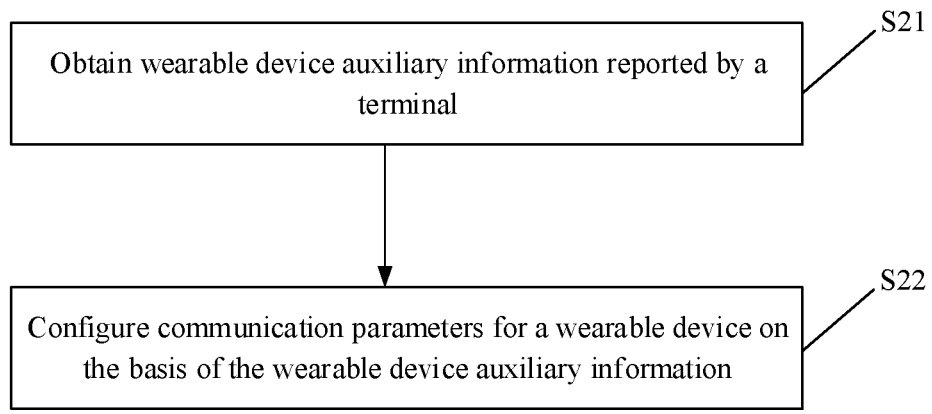
FIG. 3 is flow diagram of a method for communication shown according to an example.

FIG. 3 is flow diagram of a method for communication shown according to an example. As shown in FIG. 3, the method for communication is used for a network device and includes the following steps S21 and S22.

Step S21: obtain wearable device auxiliary information reported by a terminal.

The wearable device auxiliary information is auxiliary information of a wearable device having a bonding relation with the terminal.

Step S22: configure communication parameters for a wearable device on the basis of the wearable device auxiliary information.

In an example of the disclosure, the network device obtains the wearable device auxiliary information reported by the terminal, and configures the communication parameters for the wearable device on the basis of the wearable device auxiliary information, which is conductive to optimization of a process for configuring the communication parameters of the wearable device and optimization of function implementation of the wearable device.

In an example of the disclosure, the method for communication involved in the above examples is illustrated by examples in combination with practical application.

In an example of the disclosure, when reporting indication information of a wearable device to a network device, a terminal may transmit the indication information to the network device, and the indication information indicates that reported auxiliary information is wearable device auxiliary information, so as to distinguish terminal auxiliary information from wearable device auxiliary information reported by the terminal.

Further, in an example of the disclosure, the terminal may further report terminal auxiliary information to the network device. If auxiliary information reported by a terminal to a network device includes terminal auxiliary information and wearable device auxiliary information, the terminal independently reports the terminal auxiliary information and the wearable device auxiliary information. For example, in a method, terminal auxiliary information and wearable device auxiliary information may be attributed to different types of auxiliary information, and a terminal is triggered to report the terminal auxiliary information and the wearable device auxiliary information on the basis of different prohibit timers, such that reporting the terminal auxiliary information and reporting the wearable device auxiliary information do not interfere with each other.

Further, in an example of the disclosure, there may be one or more wearable devices having a bonding relation with a terminal, and different wearable devices correspond to different wearable device auxiliary information. In the disclosure, in order to distinguish wearable device auxiliary information of different wearable devices, indication information reported by a terminal to a network device may include identifier information of the wearable devices, so as to distinguish the wearable device auxiliary information of different wearable devices.

In an example of the disclosure, a terminal evaluates and counts service usage situations of a wearable device of a user within a specified time period on the basis of a user behavior that a user uses a terminal, and determined wearable device auxiliary information includes bandwidth type auxiliary information, for example, it is determined that a wearable device of a user does not perform a large bandwidth service within a specified time period. The wearable device auxiliary information reported by the terminal to the network device includes the bandwidth type auxiliary information. When the network device obtains the bandwidth type auxiliary information reported by the terminal, and configures communication parameters for the wearable device, a bandwidth of the wearable device may be reduced, for example, a certain cell is deleted.

In another example of the disclosure, a terminal evaluates and counts service usage situations of a wearable device of a user within a specified time period on the basis of a user behavior that a user uses a terminal, and determined wearable device auxiliary information includes release type auxiliary information, for example, it is determined that a wearable device temporarily leaves a wide area network (WAN) or leaves a WAN for a long time within a specified time period. If the wearable device temporarily leaves the WAN, the release type auxiliary information reported by the terminal carries an expectation to be released to an inactive state. If the wearable device leaves the WAN for a long time, the release type auxiliary information reported by the terminal carries an expectation to be released to an idle state. When obtaining the release type auxiliary information reported by the terminal and configuring the communication parameters for the wearable device, the network device configures communication parameters matching the release type auxiliary information.

In yet another example of the disclosure, a terminal evaluates and counts service usage situations of a wearable device of a user within a specified time period on the basis of a user behavior that a user uses a terminal, and determined wearable device auxiliary information includes mobility type auxiliary information. The mobility type auxiliary information indicates a mobility state of the wearable device. For example, when it is determined that a user may go running during a specified time period, the wearable device of a user may be in a medium-speed mobility state, but a mobile phone is still in an idle state. In addition, mobility states of a plurality of wearable devices in communication with a terminal by means of personal area network (PAN) communication links may also be inconsistent, for example, a bracelet and a watch connected with a mobile phone may have the same mobility state or different mobility states. The terminal reports the determined mobility type auxiliary information of the wearable device to the network device. When obtaining the mobility type auxiliary information reported by the terminal and configuring communication parameters for the wearable device, the network device configures communication parameters matching a mobility state included in the mobility type auxiliary information.

In yet another example of the disclosure, a terminal may determine wearable device auxiliary information including distance type auxiliary information on the basis of a connection relation between the terminal and a wearable device. For example, the terminal may roughly determine a position of the wearable device according to whether the wearable device is attached to the terminal.

In each of the above examples of the disclosure, a certain type of wearable device auxiliary information is used for illustrative description, and it can be understood that a terminal may report one or more types of wearable device auxiliary information when reporting wearable device auxiliary information.

In the disclosure, reporting one or more types of wearable device auxiliary information may be triggered by means of a prohibit timer. In a method, for one type of wearable device auxiliary information, a prohibit timer different from that of the other types of wearable device auxiliary information is applied. That is, reporting each type of wearable device auxiliary information is triggered by an independent prohibit timer. It can also be understood that triggering of reporting different types of wearable device auxiliary information is completely independent and do not interfere with each other. For example, the discontinuous reception (DRX) parameter type auxiliary information and the release type auxiliary information are two different types of wearable device auxiliary information, and the discontinuous reception (DRX) parameter type auxiliary information and the release type auxiliary information are triggered by means of different prohibit timers, and triggering is independent of each other and do not interfere each other.

In another method, in an example of the disclosure, one or more types of wearable device auxiliary information may be grouped, and the same prohibit timer may be performed to the wearable device auxiliary information in the same group to trigger reporting of the wearable device auxiliary information. It can be understood that the wearable device auxiliary information in the same group may be of the same type or different types.

In an example of the disclosure, when the terminal reports one or more types of wearable device auxiliary information to the network device, the same or different prohibit timers may be used for the wearable device auxiliary information of the one or more types of wearable device auxiliary information. For example, the one or more types of wearable device auxiliary information include a first type of wearable device auxiliary information and a second type of wearable device auxiliary information. A first prohibit timer is used for the first type of wearable device auxiliary information of the one or more types of wearable device auxiliary information, and a second prohibit timer is used for the second type of wearable device auxiliary information of the one or more types of wearable device auxiliary information. It should be understood that the first prohibit timer and the second prohibit timer in an example of the disclosure may be understood as the same prohibit timer, or may be understood as different prohibit timers.

Further, the first type of wearable device auxiliary information and the second type of wearable device auxiliary information in an example of the disclosure may be understood as different types of wearable device auxiliary information, and may also be understood as different groups of wearable device auxiliary information after wearable devices are grouped.

Further, in an implementation of an example of the disclosure, reporting one or more types of wearable device auxiliary information may be triggered by means of the same prohibit timer. This method can be understood as dividing one or more types of wearable device auxiliary information into a group, and using the same prohibit timer to trigger reporting of the wearable device auxiliary information.

Figure 4:
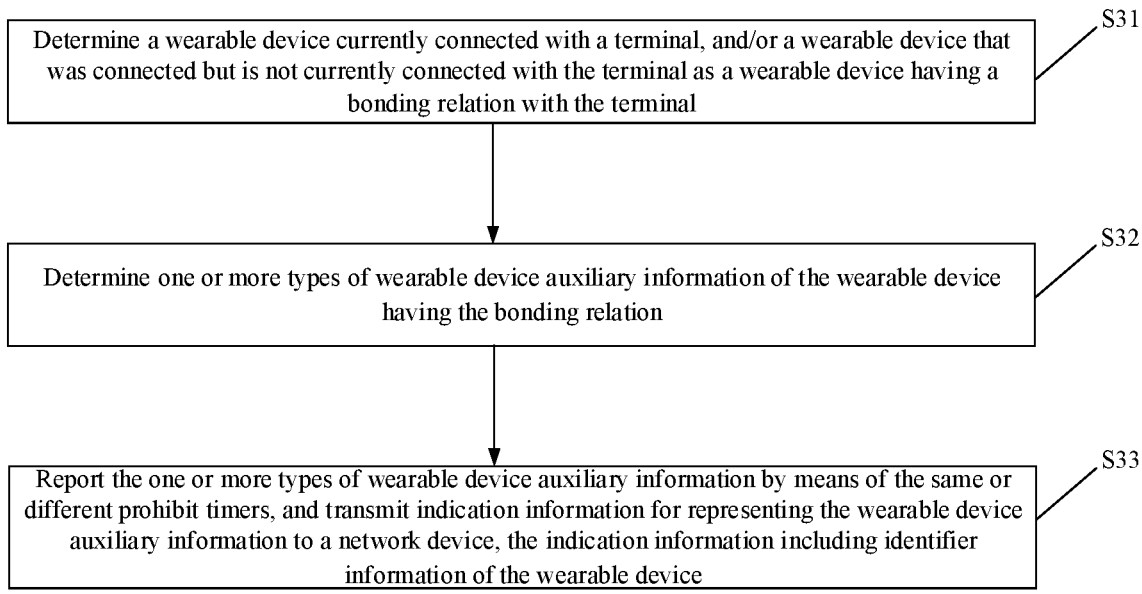
FIG. 4 is flow diagram of a method for communication shown according to an example.

FIG. 4 is flow diagram of a method for communication shown according to an example. As shown in FIG. 4, the method for communication is used for a terminal and includes the following steps S31 to S33.

Step S31: determine a wearable device currently connected with a terminal, and/or a wearable device that was connected but is not currently connected with the terminal as a wearable device having a bonding relation with the terminal.

Step S32: determine one or more types of wearable device auxiliary information of the wearable device having the bonding relation.

Step S33: report the one or more types of wearable device auxiliary information by means of the same or different prohibit timers, and transmit indication information for representing the wearable device auxiliary information to a network device, the indication information including identifier information of the wearable device.

A specific method for a terminal to report the wearable device auxiliary information in the flow of the method for communication shown in FIG. 4 is described in detail in the related examples, and will not be repeated herein.

Figure 5:
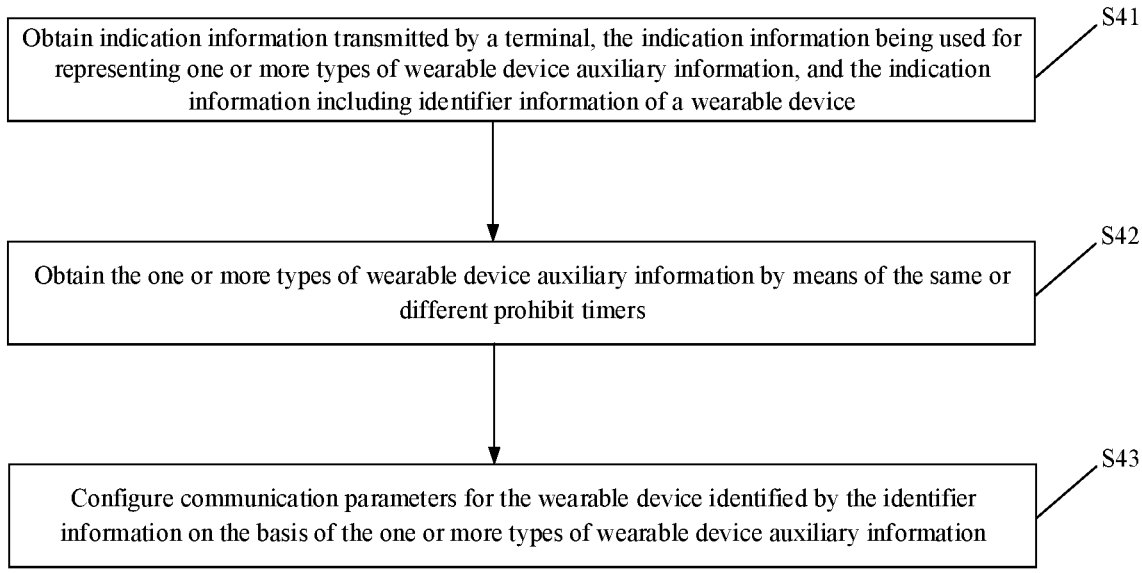
FIG. 5 is flow diagram of a method for communication shown according to an example.

FIG. 5 is flow diagram of a method for communication shown according to an example. As shown in FIG. 5, the method for communication is used for a network device and includes the following steps S41 to S43.

Step S41: obtain indication information transmitted by a terminal, the indication information being used for representing one or more types of wearable device auxiliary information, and the indication information including identifier information of a wearable device.

Step S42: obtain the one or more types of wearable device auxiliary information by means of the same or different prohibit timers.

Step S43: configure communication parameters for the wearable device identified by the identifier information on the basis of the one or more types of wearable device auxiliary information.

A specific implementation for a network device to obtain the wearable device auxiliary information in the flow of the method for communication shown in FIG. 5 is described in detail in the related examples, and will not be repeated herein.

It can be understood that the method for communication involved in the example of the disclosure may be applied to an interaction process between the terminal and the network device, and reference may be made to the related description in the above example for a processing process performed by the terminal and a processing process performed by the network device in the interaction process, which will not be repeated herein.

On the basis of the same concept, an example of the disclosure further provides an apparatus for communication.

It can be understood that in order to realize the above functions, the apparatus for communication provided in an example of the disclosure includes corresponding hardware structures and/or software modules for executing all the functions. The examples of the disclosure, in combination with the illustrative units and algorithm steps disclosed in the examples of the disclosure, may be implemented in the form of hardware or a combination of hardware and computer software. Whether a certain function is executed by means of hardware or by driving hardware by computer software depends on specific application and design constraint conditions of the technical solution. A person skilled in the art may implement the described functions through different methods for each particular application, but such implementation should not be considered beyond the scope of the technical solution of the examples of the disclosure.

Figure 6:
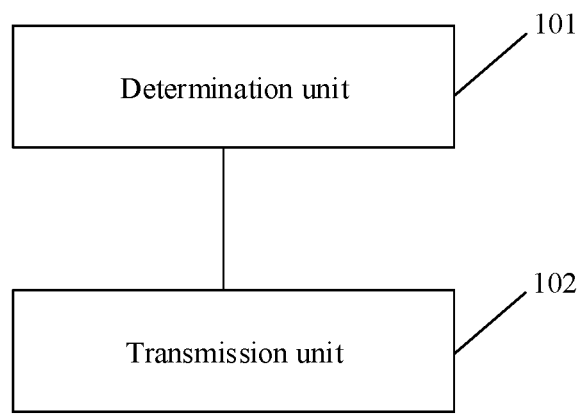
FIG. 6 is a block diagram of an apparatus for communication shown according to an example.

FIG. 6 is a block diagram of an apparatus for communication shown according to an example. With reference to FIG. 6, the apparatus for communication 100 is applied to a terminal, and the apparatus for communication 100 includes a determination unit 101 and a transmission unit 102. The determination unit 101 is configured to determine a wearable device having a bonding relation with the terminal, and wearable device auxiliary information for the wearable device. The transmission unit 102 is configured to report the wearable device auxiliary information to a network device.

In an implementation, the transmission unit 102 reports the wearable device auxiliary information to the network device through the following method that includes: transmit indication information to the network device, the indication information being used for representing the wearable device auxiliary information.

In another implementation, the indication information includes identifier information of the wearable device.

In yet another implementation, the wearable device auxiliary information includes one or more types of wearable device auxiliary information. The transmission unit 102 uses a first prohibit timer for a first type of wearable device auxiliary information of the one or more types of wearable device auxiliary information, and uses a second prohibit timer for a second type of wearable device auxiliary information of the one or more types of wearable device auxiliary information.

In yet another implementation, the wearable device auxiliary information includes one or more types of wearable device auxiliary information. The transmission unit 102 uses the same prohibit timer for the one or more types of wearable device auxiliary information.

In yet another implementation, the transmission unit 102 is further configured to report terminal auxiliary information for the terminal to the network device. The prohibit timer for reporting the terminal auxiliary information to the network device by the transmission unit 102 being different from the prohibit timer for reporting the wearable device auxiliary information to the network device.

In yet another implementation, the wearable device auxiliary information includes one or more of the following types: service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the determination unit 101 determines a wearable device having a bonding relation with the terminal through the following method that includes: determine a wearable device currently connected with a terminal as the wearable device having a bonding relation with the terminal, and/or determine a wearable device that was connected but is not currently connected with the terminal as the wearable device having a bonding relation with the terminal.

Figure 7:
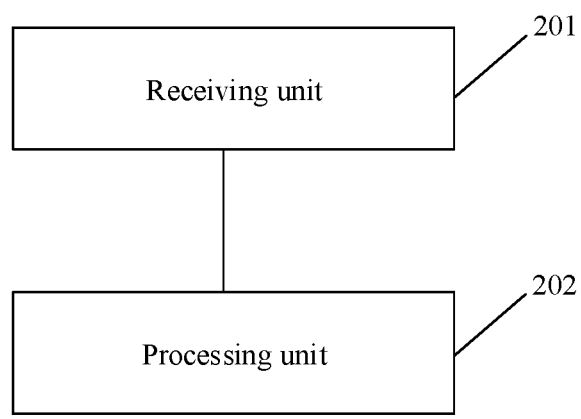
FIG. 7 is a block diagram of an apparatus for communication shown according to an example.

FIG. 7 is a block diagram of an apparatus for communication shown according to an example. With reference to FIG. 7, the apparatus for communication 200 is applied to a network device, and the apparatus for communication 200 includes an obtaining unit 201 and a processing unit 202. The obtaining unit 201 is configured to obtain wearable device auxiliary information reported by a terminal, the wearable device auxiliary information being auxiliary information of a wearable device having a bonding relation with the terminal. The processing unit 202 is configured to configure communication parameters for the wearable device on the basis of the wearable device auxiliary information.

In an implementation, the obtaining unit 201 is used for obtaining the wearable device auxiliary information reported by the terminal through the following method that includes: obtain indication information transmitted by the terminal, the indication information being used for representing the wearable device auxiliary information.

In another implementation, the indication information includes identifier information of the wearable device.

In yet another implementation, the wearable device auxiliary information includes one or more types of wearable device auxiliary information. The obtaining unit 201 obtains a first type of wearable device auxiliary information of the one or more types of wearable device auxiliary information by means of a first prohibit timer, and obtains a second type of wearable device auxiliary information of the one or more types of wearable device auxiliary information by means of a second prohibit timer.

In yet another implementation, the wearable device auxiliary information includes one or more types of wearable device auxiliary information. The obtaining unit 201 obtains the wearable device auxiliary information of the one or more types by means of the same prohibit timer.

In yet another implementation, the obtaining unit 201 is further configured to obtain terminal auxiliary information reported by the terminal.

A prohibit timer for obtaining the terminal auxiliary information by the obtaining unit 201 is different from the prohibit timer for obtaining the wearable device auxiliary information.

In yet another implementation, the wearable device auxiliary information includes one or more of the following types:

service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the wearable device having a bonding relation with the terminal includes: a wearable device currently connected with the terminal; and/or a wearable device that was connected but is not currently connected with the terminal.

For the apparatus in the above-mentioned example, a specific method for each module to execute an operation is described in detail in examples relating to the method, and will not be repeated herein.

Figure 8:
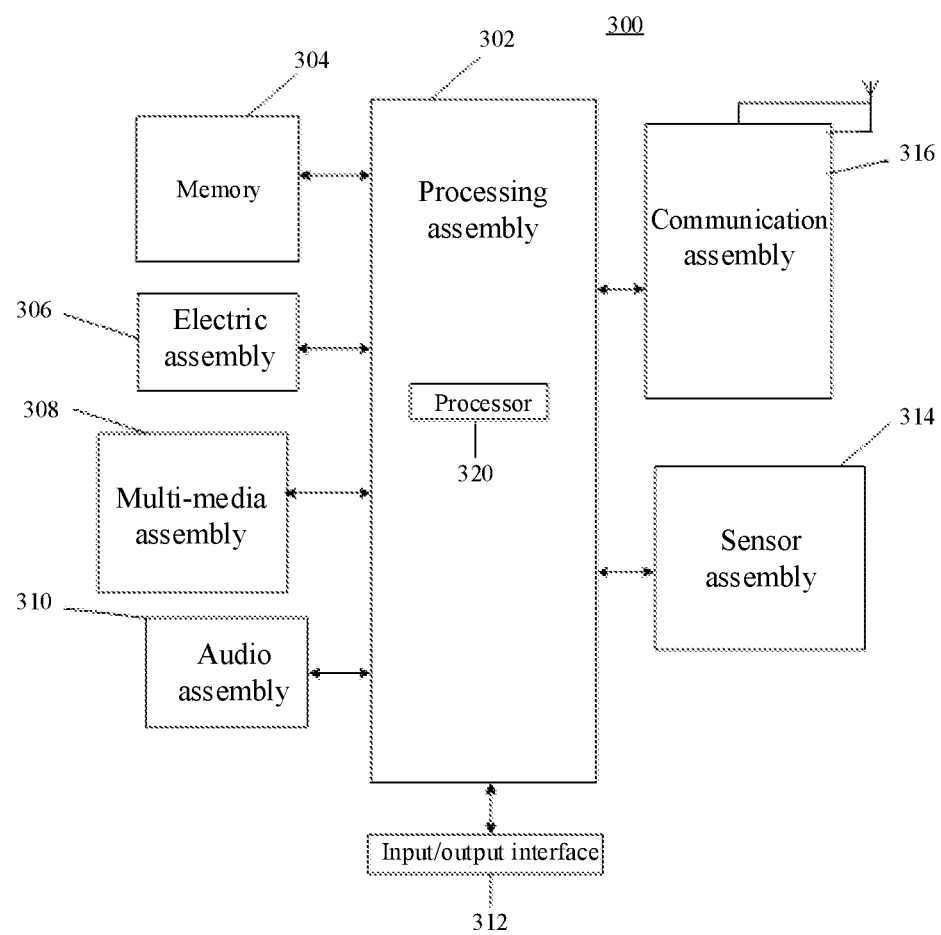
FIG. 8 is block diagram of an apparatus for communication shown according to an example.

FIG. 8 is block diagram of an apparatus 300 for communication shown according to an example. For example, the apparatus 300 may be a mobile phone, a computer, a digital broadcasting terminal, a message receiving and transmitting device, a game console, a tablet device, a medical device, a fitness device, a personal digital assistant, etc.

With reference to FIG. 8, the apparatus 300 may include one or more of the following assemblies: a processing assembly 302, a memory 304, an electric assembly 306, a multi-media assembly 308, an audio assembly 310, an input/output (I/O) interface 312, a sensor assembly 314, and a communication assembly 316.

The processing assembly 302 typically controls overall operation of the apparatus 300, such as operations associated with display, telephone call, data communication, camera operation and recording. The processing assembly 302 may include one or more processors 320 to execute instructions, so as to complete all or part of the steps of the above method. Further, the processing assembly 302 may include one or more modules, so as to facilitate interaction between the processing assembly 302 and other assemblies. For example, the processing assembly 302 may include a multi-media module, so as to facilitate interaction between the multi-media assembly 308 and the processing assembly 302.

The memory 304 is configured to store various types of data, so as to support operations at the apparatus 300. Examples of such data include instructions for any application or method operating on the apparatus 300, contact data, phonebook data, messages, pictures, videos, etc. The memory 304 may be realized by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electric assembly 306 provides power for various assemblies of the apparatus 300. The electric assembly 306 may include a power source management system, one or more power sources, and other assemblies associated with generation, management and power distribution of the apparatus 300.

The multi-media assembly 308 includes a screen that provides an output interface between the apparatus 300 and a user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors, so as to sense touches, swipes, and gestures on the touch panel. The touch sensor may sense not only a boundary of a touch or swipe, but also time and pressure associated with the touch or swipe. In some examples, the multi-media assembly 308 includes a front facing camera and/or a rear facing camera. When the device 300 is in an operating mode, such as a shooting mode or a video mode, the front facing camera and/or the rear facing camera may receive external multi-media data. Each of the front facing camera and the rear facing camera may be a fixed optical lens system or have focusing and optical zooming capabilities.

The audio assembly 310 is configured to output and/or input audio signals. For example, the audio assembly 310 may include a microphone (MIC) that is configured to receive external audio signals when the apparatus 300 is in an operating mode, such as a call mode, a recording mode, and a voice recognition mode. The received audio signals may be further stored in the memory 304 or transmitted by means of the communication assembly 316. In some examples, the audio assembly 310 further includes a loudspeaker for outputting audio signals.

The I/O interface 312 provides an interface between the processing assembly 302 and peripheral interface modules, such as keyboards, click wheels and buttons. These buttons may include, but are not limited to: home buttons, volume buttons, start buttons, and lock buttons.

The sensor assembly 314 may include one or more sensors for providing status assessment of various aspects of the apparatus 300. For example, the sensor assembly 314 may detect an open/closed state of the device 300, and relative positioning of assemblies, for example, a display and keypad of the apparatus 300. The sensor assembly 314 may further detect a change in position of the apparatus 300 or an assembly of the apparatus 300, presence or absence of contact between a user and the apparatus 300, orientation or acceleration/deceleration of the apparatus 300, and a temperature change of the apparatus 300. The sensor assembly 314 may include a proximity sensor configured to detect the presence of a nearby object in the absence of any physical contact. The sensor assembly 314 may further include a light sensor, such as a complementary metal oxide semiconductor (CMOS) or charge coupled device (CCD) image sensor for being used in imaging applications. In some examples, the sensor assembly 314 may further include an acceleration sensor, a gyroscopic sensor, a magnetic sensor, a pressure sensor, or a temperature sensor.

The communication assembly 316 is configured to facilitate wired or wireless communication between the apparatus 300 and other devices. The apparatus 300 may access a wireless network based on a communication standard, such as Wi-Fi, 2G, 3G, or their combination. In an example, the communication assembly 316 receives a broadcast signal or broadcast related information from an external broadcast management system by means of a broadcast channel. In an example, the communication assembly 316 further includes a near-field communication (NFC) module, so as to facilitate short-range communication. For example, the NFC module may be realized on the basis of a radio frequency identification (RFID) technology, an infrared data association (IrDA) technology, an ultra wideband (UWB) technology, a Bluetooth (BT) technology, and other technologies.

In an example, the apparatus 300 may be realized by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, so as to be used for executing the above methods.

An example provides a non-transitory computer-readable storage medium including an instruction, such as a memory 304 including an instruction, and the instruction may be executed by the processor 320 of the apparatus 300, so as to implement the above method. For example, the non-transitory computer-readable storage medium may be the read-only memories (ROMs), random access memories (RAMs), compact disc read-only memories (CD-ROMs), magnetic tapes, floppy disks, optical data storage devices, etc.

Figure 9:
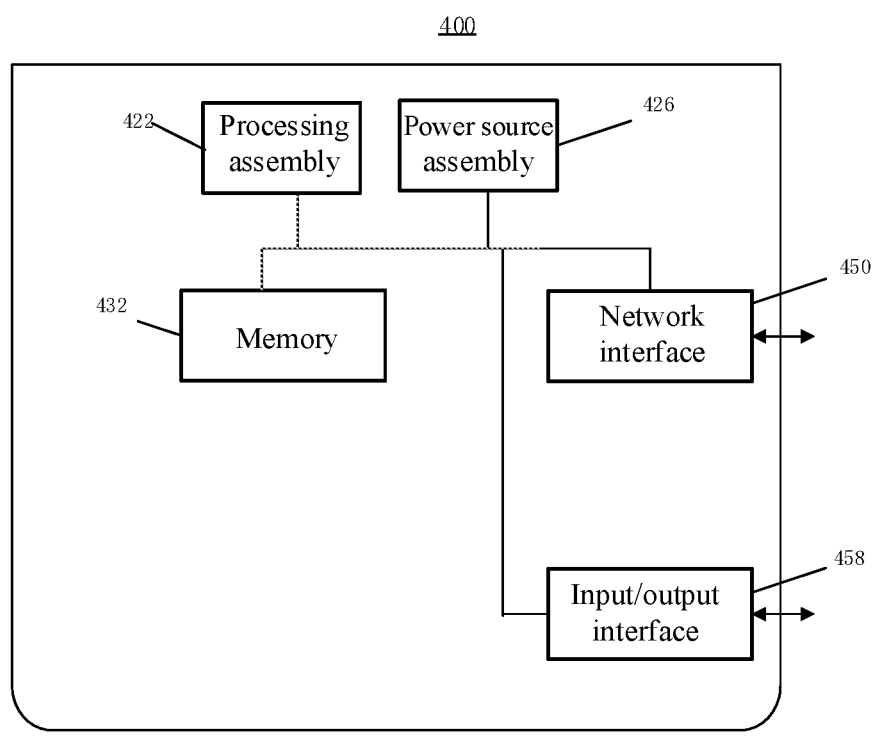
FIG. 9 is block diagram of an apparatus for communication shown according to an example.

FIG. 9 is block diagram of an apparatus 400 for communication shown according to an example. For example, the apparatus 400 may be provided as a network device, such as a base station. With reference to FIG. 9, the apparatus 400 includes a processing assembly 422, which further includes one or more processors, and memory resources represented by the memory 432 for storing an instruction that may be executed by the processing assembly 422, such as an application. The application stored in the memory 432 may include one or more modules that each correspond to a set of instructions. In addition, the processing assembly 422 is configured to execute an instruction, so as to execute the above method.

The apparatus 400 may further include a power source assembly 426 configured to execute power source management of the apparatus 400, a wired or wireless network interface 450 configured to connect the apparatus 400 with a network, and an input/output (I/O) interface 458. The apparatus 400 may operate an operating system stored in the memory 432, such as Windows Server™, Mac OS X™, Unix™, Linux™, FreeBSD$^M$ and similar systems.

An example provides a non-transitory computer-readable storage medium including an instruction, such as a memory 432 including an instruction, and the instruction may be executed by the processor 422 of the apparatus 400, so as to implement the above method. For example, the non-transitory computer-readable storage medium may be the read-only memories (ROMs), random access memories (RAMs), compact disc read-only memories (CD-ROMs), magnetic tapes, floppy disks, optical data storage devices, etc.

It can be further understood that the term "plurality" in the disclosure refers to two or above, and other quantifiers are similar. The term "and/or", which is an association relation describing an associated object, means that there may be three relations. For example, an A and/or a B may represent three situations: there is the A alone, there are the A and the B at the same time, and there is the B alone. The character "/" generally indicates that association objects in the context are in an "or" relation. The singular forms such as "a", "the" and "this" used are also intended to include the plural forms, unless otherwise clearly stated in the context.

It can be further understood that the terms "first", "second", etc. are used for describing various information, but this information should not be limited by these terms. These terms are merely used to distinguish the same type of information from each other, and do not denote any specific order or importance. In fact, the expressions "first", "second", etc. can be used interchangeably. For example, first information could also be referred to as second information, and similarly, second information could also be referred to as first information, without departing from the scope of the disclosure.

It can be further understood that although operations are described in the accompanying drawings in specific order in examples of the disclosure, it should not be understood that these operations are required to be executed in shown specific order or in serial order, or that all illustrated operations are required to be executed so as to realize expected results. In certain circumstances, multitasking and parallel processing may be advantageous.

A person skilled in the art could easily conceive of other implementation solutions of the disclosure upon consideration of the description and the invention disclosed in the implementation. The disclosure is intended to cover any variations, uses or adaptive changes of the disclosure, which follow the general principles of the disclosure and include common general knowledge or customary technical means in the art that is not disclosed in the disclosure. The description and the examples are to be regarded as illustrative merely, and the true scope and spirit of the disclosure are indicated by the following claims.

It should be understood that the disclosure is not limited to a precise structure that has been described above and illustrated in the accompanying drawings, and may have various modifications and changes without departing from the its scope. The scope of the disclosure is limited by the appended claims only.

A first aspect of examples of the disclosure provides a method for communication. The method for communication is performed by a terminal and includes:

determining a wearable device having a bonding relation with the terminal, and wearable device auxiliary information for the wearable device; and reporting the wearable device auxiliary information to a network device.

In an implementation, the step of reporting the wearable device auxiliary information to a network device includes:

transmitting indication information to the network device, the indication information being used for representing the wearable device auxiliary information.

In another implementation, the indication information includes identifier information of the wearable device.

In yet another implementation, the wearable device auxiliary information includes one or more types of wearable device auxiliary information. The step of reporting the wearable device auxiliary information to a network device includes: using a first prohibit timer for a first type of wearable device auxiliary information of the one or more types of wearable device auxiliary information, and using a second prohibit timer for a second type of wearable device auxiliary information of the one or more types of wearable device auxiliary information.

In yet another implementation, the wearable device auxiliary information includes one or more types of wearable device auxiliary information. The step of reporting the wearable device auxiliary information to a network device includes: using the same prohibit timer for the one or more types of wearable device auxiliary information.

In yet another implementation, the method for communication involved in an example of the disclosure further includes: reporting terminal auxiliary information for the terminal to the network device, a prohibit timer for reporting the terminal auxiliary information to the network device being different from the prohibit timer for reporting the wearable device auxiliary information to the network device.

In yet another implementation, the wearable device auxiliary information includes one or more of the following types: service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the step of determining a wearable device having a bonding relation with the terminal includes:
 determining a wearable device currently connected with the terminal as the wearable device having a bonding relation with the terminal; and/or determining a wearable device that was connected but is not currently connected with the terminal as the wearable device having a bonding relation with the terminal.

A second aspect of an example of the disclosure provides a method for communication. The method for communication is performed by a network device and includes:
 obtaining wearable device auxiliary information reported by a terminal, the wearable device auxiliary information being auxiliary information of a wearable device having a bonding relation with the terminal; and configuring communication parameters for the wearable device on the basis of the wearable device auxiliary information.

In an implementation, the step of obtaining wearable device auxiliary information reported by a terminal includes:
 obtaining indication information transmitted by the terminal, the indication information being used for representing the wearable device auxiliary information.

In another implementation, the indication information includes identifier information of the wearable device.

In yet another implementation, the wearable device auxiliary information includes one or more types of wearable device auxiliary information. The step of obtaining wearable device auxiliary information reported by a terminal includes: obtaining a first type of wearable device auxiliary information of the one or more types of wearable device auxiliary information by means of a first prohibit timer, and obtaining a second type of wearable device auxiliary information of the one or more types of wearable device auxiliary information by means of a second prohibit timer.

In yet another implementation, the wearable device auxiliary information includes one or more types of wearable device auxiliary information. The step of obtaining wearable device auxiliary information reported by a terminal includes: obtaining the one or more types of wearable device auxiliary information by means of the same prohibit timer.

In yet another implementation, the method for communication involved in an example of the disclosure further includes: obtaining terminal auxiliary information reported by the terminal, a prohibit timer for obtaining the terminal auxiliary information by the network device being different from the prohibit timer for obtaining the wearable device auxiliary information.

In yet another implementation, the wearable device auxiliary information includes one or more of the following types:
 service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the wearable device having a bonding relation with the terminal includes: a wearable device currently connected with the terminal; and/or a wearable device that was connected but is not currently connected with the terminal.

A third aspect of examples of the disclosure provides an apparatus for communication. The apparatus for communication is applied to a terminal and includes: a determination unit configured to determine a wearable device having a bonding relation with the terminal, and wearable device auxiliary information for the wearable device; and a transmission unit configured to report the wearable device auxiliary information to a network device.

In an implementation, the transmission unit reports the wearable device auxiliary information to the network device through the following method that includes: transmitting indication information to the network device, the indication information being used for representing the wearable device auxiliary information.

In another implementation, the indication information includes identifier information of the wearable device.

In yet another implementation, the wearable device auxiliary information includes one or more types of wearable device auxiliary information. The transmission unit uses a first prohibit timer for a first type of wearable device auxiliary information of the one or more types of wearable device auxiliary information, and uses a second prohibit timer for a second type of wearable device auxiliary information of the one or more types of wearable device auxiliary information.

In yet another implementation, the wearable device auxiliary information includes one or more types of wearable device auxiliary information. The transmission unit uses the same prohibit timer for the one or more types of wearable device auxiliary information.

In yet another implementation, the transmission unit is further configured to report terminal auxiliary information for the terminal to the network device, the prohibit timer for reporting the terminal auxiliary information to the network device by the transmission unit being different from the prohibit timer for reporting the wearable device auxiliary information to the network device.

In yet another implementation, the wearable device auxiliary information includes one or more of the following types: service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the determination unit determines a wearable device having a bonding relation with the terminal through the following method that includes:
    determining a wearable device currently connected with the terminal as the wearable device having a bonding relation with the terminal; and/or determining a wearable device that was connected but is not currently connected with the terminal as the wearable device having a bonding relation with the terminal.

A fourth aspect of examples of the disclosure provides an apparatus for communication. The apparatus for communication is applied to a network device and includes: an obtaining unit configured to obtain wearable device auxiliary information reported by a terminal, the wearable device auxiliary information being auxiliary information of a wearable device having a bonding relation with the terminal; and a processing unit configured to configure communication parameters for the wearable device on the basis of the wearable device auxiliary information.

In an implementation, the obtaining unit is used for obtaining the wearable device auxiliary information reported by the terminal through the following method that includes: obtaining indication information transmitted by the terminal, the indication information being used for representing the wearable device auxiliary information.

In another implementation, the indication information includes identifier information of the wearable device.

In yet another implementation, the wearable device auxiliary information includes one or more types of wearable device auxiliary information. The obtaining unit obtains a first type of wearable device auxiliary information of the one or more types of wearable device auxiliary information by means of a first prohibit timer, and obtains a second type of wearable device auxiliary information of the one or more types of wearable device auxiliary information by means of a second prohibit timer.

In yet another implementation, the wearable device auxiliary information includes one or more types of wearable device auxiliary information. The obtaining unit obtains the one or more types of wearable device auxiliary information by means of the same prohibit timer.

In yet another implementation, the obtaining unit is further configured to obtain terminal auxiliary information reported by the terminal,
    a prohibit timer for obtaining the terminal auxiliary information by the obtaining unit being different from the prohibit timer for obtaining the wearable device auxiliary information.

In yet another implementation, the wearable device auxiliary information includes one or more of the following types:
    service characteristic type auxiliary information, discontinuous reception (DRX) parameter configuration type auxiliary information, bandwidth type auxiliary information, release type auxiliary information, mobility type auxiliary information and distance type auxiliary information.

In yet another implementation, the wearable device having a bonding relation with the terminal includes: a wearable device currently connected with the terminal; and/or a wearable device that was connected but is not currently connected with the terminal.

A fifth aspect of examples of the disclosure provides an apparatus for communication. The apparatus for communication includes:
    a processor; and a memory for storing instructions that may be executed by the processor,
    the processor being configured to execute the method for communication in the first aspect or any implementation in the first aspect.

A sixth aspect of examples of the disclosure provides an apparatus for communication. The apparatus for communication includes:
    a processor; and a memory for storing instructions that may be executed by the processor,
    the processor being configured to execute the method for communication in the second aspect or any implementation in the second aspect.

A seventh aspect of examples of the disclosure provides a non-transitory computer-readable storage medium. When executed by a processor of a mobile terminal, instructions in the storage medium enable the mobile terminal to execute the method for communication in the first aspect or any implementation in the first aspect.

An eighth aspect of examples of the disclosure provides a non-transitory computer-readable storage medium. Instructions in the storage medium, when executed by a processor of a network device, enable the network device to execute the method for communication in the second aspect or any implementation in the second aspect.

The technical solutions provided in the examples of the disclosure may include the following beneficial effects: the wearable device auxiliary information is determined and reported by means of the terminal such that the network device may better configure communication parameters for a bonded device.

The invention claimed is:

1. A method for communication, performed by a terminal and comprising:
    determining a wearable device having a bonding relation with the terminal, and wearable device auxiliary information for the wearable device;
    reporting the wearable device auxiliary information to a network device; and
    reporting terminal auxiliary information for the terminal to the network device,
    wherein a prohibit timer for reporting the terminal auxiliary information to the network device is different from a prohibit timer for reporting the wearable device auxiliary information to the network device.

2. The method for communication according to claim 1, wherein reporting the wearable device auxiliary information to the network device comprises:
    transmitting indication information to the network device, the indication information being used for representing the wearable device auxiliary information.

3. The method for communication according to claim 2, wherein the indication information comprises identifier information of the wearable device.

4. The method for communication according to claim 1, wherein the wearable device auxiliary information comprises one or more types of wearable device auxiliary information; and
    reporting the wearable device auxiliary information to the network device comprises:
        using a first prohibit timer for a first type of wearable device auxiliary information of the one or more types of wearable device auxiliary information, and using a second prohibit timer for a second type of wearable device auxiliary information of the one or more types of wearable device auxiliary information.

5. The method for communication according to claim 1, wherein the wearable device auxiliary information comprises one or more types of wearable device auxiliary information; and
reporting the wearable device auxiliary information to the network device comprises:
using the same prohibit timer for the one or more types of wearable device auxiliary information.

6. The method for communication according to claim 1, wherein the wearable device auxiliary information comprises one or more selected from the following group:
service characteristic type auxiliary information, discontinuous reception (DRX) parameter configuration type auxiliary information, bandwidth type auxiliary information, release type auxiliary information, mobility type auxiliary information, and distance type auxiliary information.

7. The method for communication according to claim 1, wherein determining a wearable device having a bonding relation with the terminal comprises at least one of the following:
determining a wearable device currently connected with the terminal as the wearable device having a bonding relation with the terminal; or
determining a wearable device that was connected but is not currently connected with the terminal as the wearable device having a bonding relation with the terminal.

8. A method for communication, performed by a network device and comprising:
obtaining wearable device auxiliary information reported by a terminal, the wearable device auxiliary information being auxiliary information of a wearable device having a bonding relation with the terminal;
configuring communication parameters for the wearable device based on the wearable device auxiliary information; and
obtaining terminal auxiliary information reported by the terminal,
wherein a prohibit timer for obtaining the terminal auxiliary information by the network device is different from a prohibit timer for obtaining the wearable device auxiliary information.

9. A non-transitory computer-readable storage medium, wherein when executed by a processor of a mobile terminal, instructions in the storage medium cause the mobile terminal to perform the method for communication of claim 1.

10. The method for communication according to claim 8, wherein obtaining wearable device auxiliary information reported by the terminal comprises:
obtaining indication information transmitted by the terminal, the indication information being used for representing the wearable device auxiliary information.

11. The method for communication according to claim 10, wherein the indication information comprises identifier information of the wearable device.

12. The method for communication according to claim 8, wherein the wearable device auxiliary information comprises one or more types of wearable device auxiliary information; and
obtaining wearable device auxiliary information reported by a terminal comprises:
obtaining a first type of wearable device auxiliary information of the one or more types of wearable device auxiliary information by means of a first prohibit timer, and obtaining a second type of wearable device auxiliary information of the one or more types of wearable device auxiliary information by means of a second prohibit timer.

13. The method for communication according to claim 8, wherein
the wearable device auxiliary information comprises one or more types of wearable device auxiliary information; and
obtaining wearable device auxiliary information reported by a terminal comprises:
obtaining the one or more types of wearable device auxiliary information by means of the same prohibit timer.

14. The method for communication according to claim 8, wherein the wearable device auxiliary information comprises one or more of the following types:
service characteristic type auxiliary information, discontinuous reception (DRX) parameter configuration type auxiliary information, bandwidth type auxiliary information, release type auxiliary information, mobility type auxiliary information, and distance type auxiliary information.

15. The method for communication according to claim 8, wherein the wearable device having a bonding relation with the terminal comprises at least one of the following:
a wearable device currently connected with the terminal; or
a wearable device that was connected but is not currently connected with the terminal.

16. An apparatus for communication, comprising:
a processor; and
a memory for storing instructions that can be executed by the processor,
the processor being configured to execute the method for communication of claim 8.

17. A non-transitory computer-readable storage medium, wherein when executed by a processor of a network device, instructions in the storage medium cause the network device to perform the method for communication of claim 8.

18. An apparatus for communication, comprising:
a processor; and
a memory for storing instructions that can be executed by the processor,
wherein the processor is configured to:
determine a wearable device having a bonding relation with a terminal, and wearable device auxiliary information for the wearable device;
report the wearable device auxiliary information to a network device; and
report terminal auxiliary information for the terminal to the network device,
wherein a prohibit timer for reporting the terminal auxiliary information to the network device is different from a prohibit timer for reporting the wearable device auxiliary information to the network device.

* * * * *